United States Patent Office 3,430,658
Patented Mar. 4, 1969

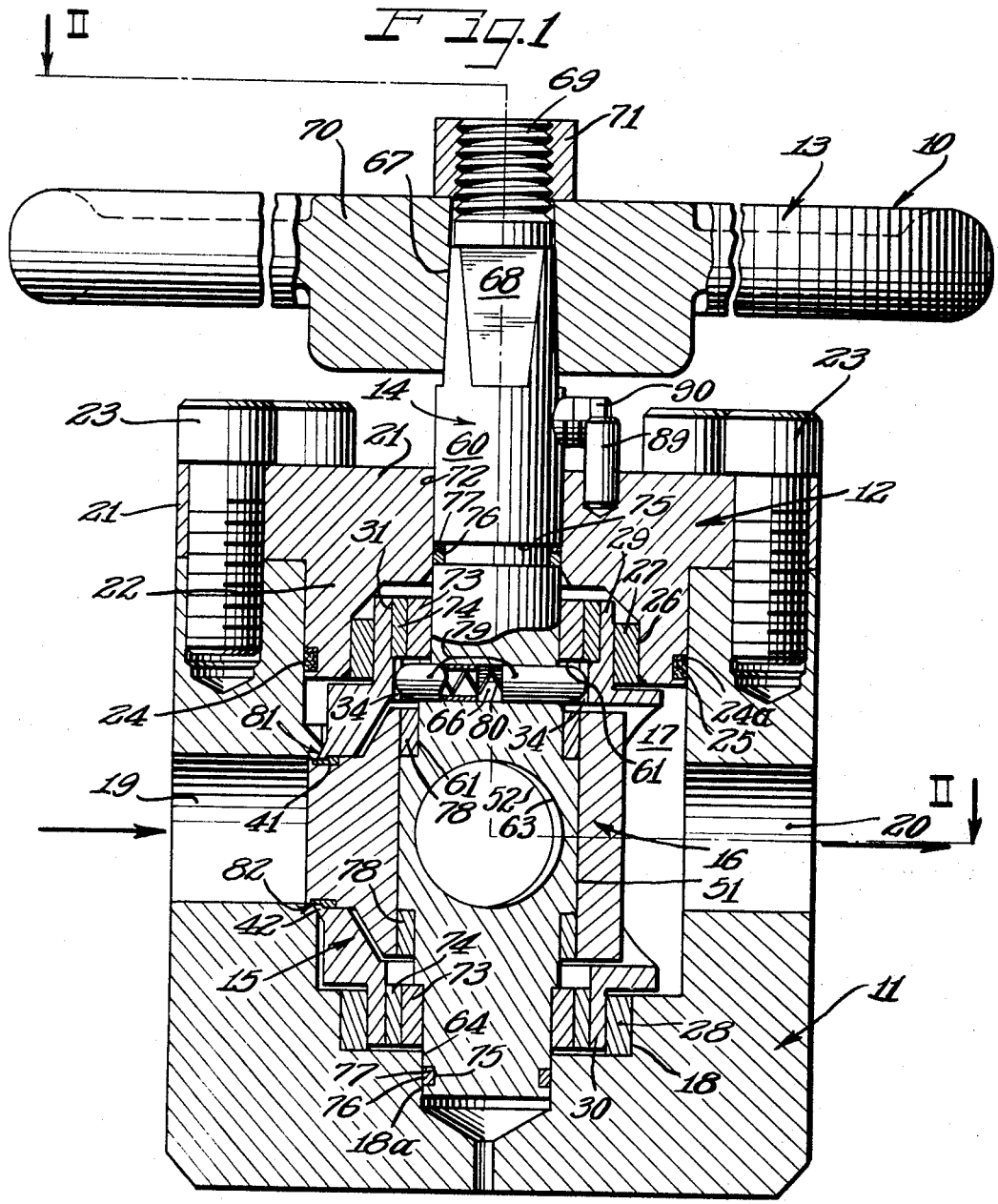

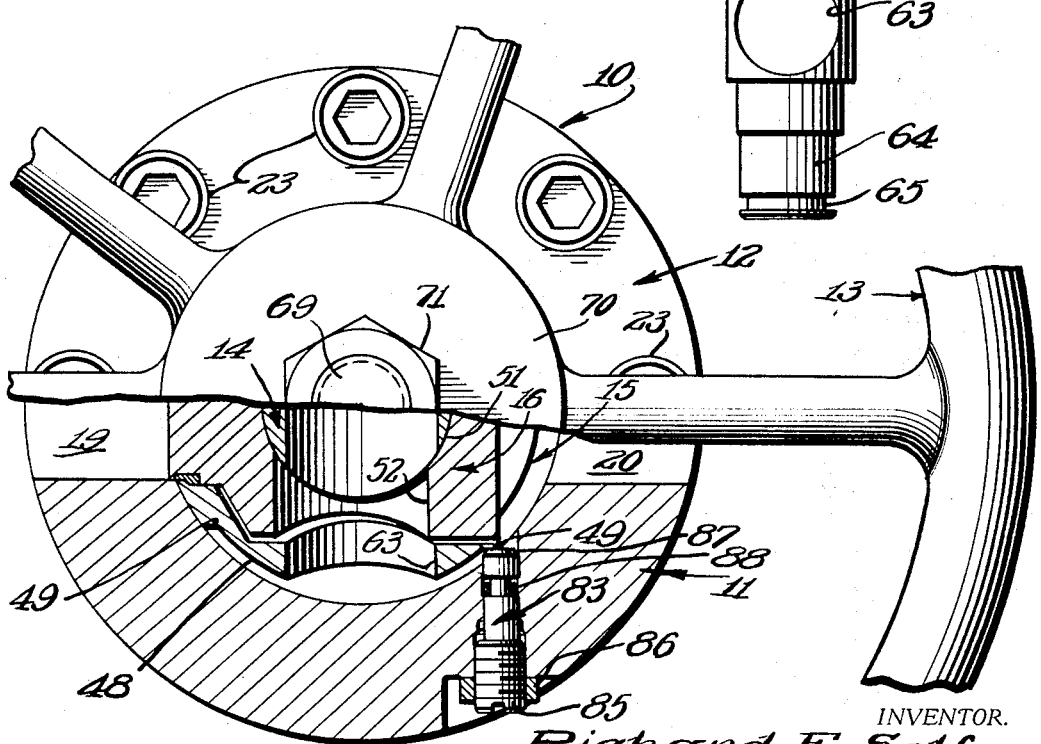

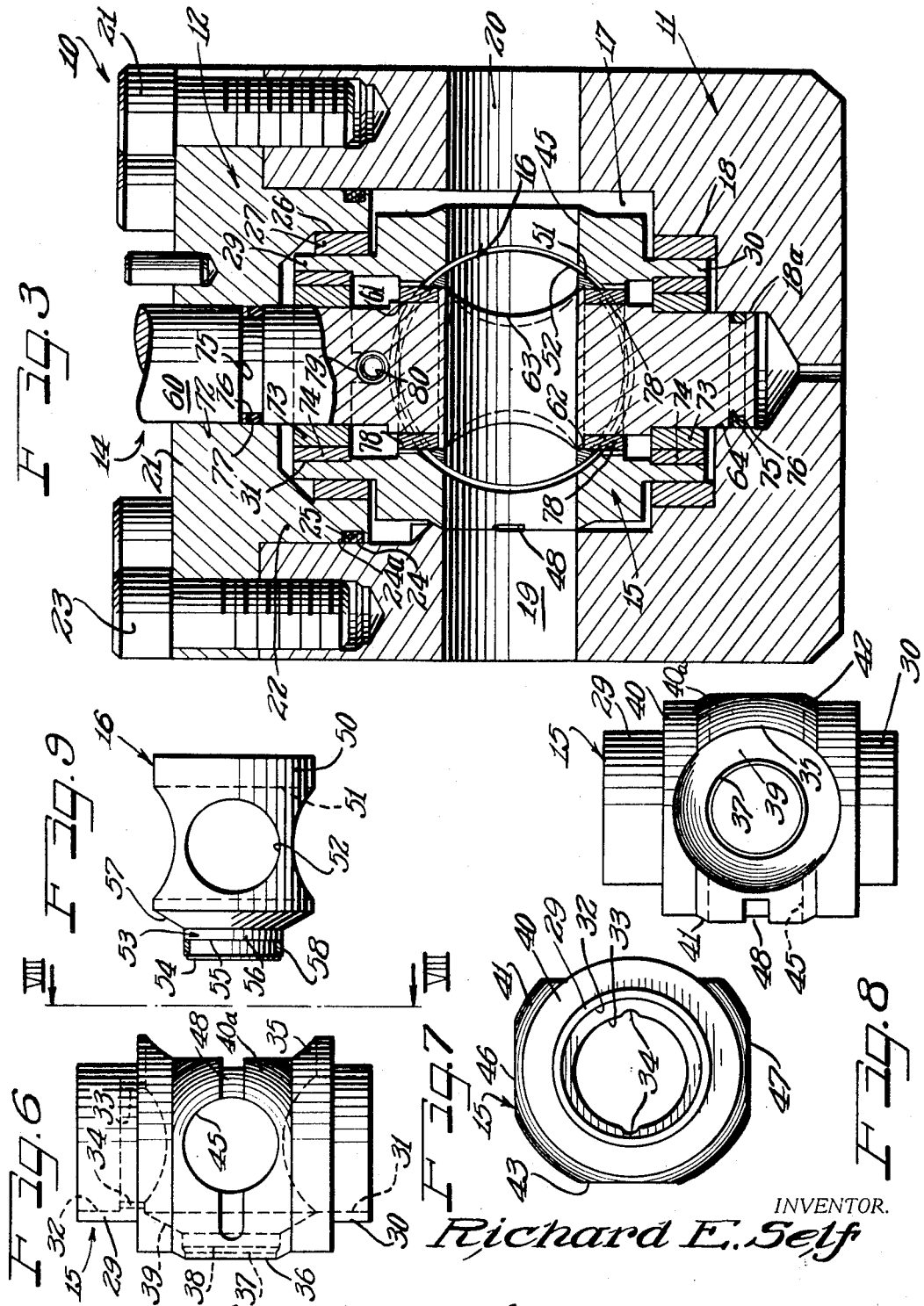

3,430,658
FLOW CONTROL VALVE
Richard E. Self, 3221 Brimhall Drive,
Los Alamitos, Calif. 90720
Filed June 14, 1965, Ser. No. 463,739
U.S. Cl. 137—628          7 Claims
Int. Cl. F16k 5/04, 5/18, 39/06

ABSTRACT OF THE DISCLOSURE

A rotary flow control valve, preferably a ball valve wherein the rotor or ball carries a shiftable poppet member and has a shaft extending therethrough with an eccentric portion to shift the poppet member from a retracted position inside of the rotor to a projected position in sealing engagement with a valve port. The poppet member has a nose carrying a deformable seal which is completely encapsulated in the rotor until the poppet member is shifted by the shaft into sealed engagement with the valve port. The shaft has a selective drive connection with the rotor and stop means are provided to disconnect the drive whereupon the eccentric portion of the shaft will shift the poppet member into its sealed engagement with the valve port. The poppet member in its retracted position does not ride on the walls of the housing chamber receiving the rotor and the rotor need not be tightly sealed in the housing, whereby driving effort for moving the rotor is minimized.

---

This invention relates to flow control valves of the rotor or ball type which are equipped with a shiftable seat member which sealingly engages a valve port when the rotor or ball is moved to a closed position thereby insuring an efficient tight seal for preventing any leakage through the valve. Specifically this invention deals with ball valves having a shiftable poppet member in the ball rotor that is equipped with a seat or plug having a deformable seal therearound and an eccentric actuator for the poppet to move the seal into a valve port in the closed position of the valve for efficiently sealing the valve against leakage.

This invention will be hereinafter specifically described in its preferred embodiment of a ball valve wherein the ball member or rotor receives a shaft therethrough and has a shiftable poppet member therein driven by the shaft into sealed engagement with an inlet port of the valve housing to stop leakage through the valve. In its preferred embodiment the poppet member has a nose with a surrounding deformable seal composed of Teflon, rubber, nylon, soft deformable metal, or the like, which is completely encapsulated in the ball member until the poppet member is shifted by the drive shaft for moving the seal into sealed contact with a valve port.

Heretofore, ball valves could not be tightly sealed without incorporating a tight friction producing mounting for the ball member which not only interfered with operation of the ball member but also induced wear characteristics of such magnitude as to render the valve unsuitable for handling many types of fluids. The present invention now fully encapsules a valve seal within the ball member for comovement therewith thereby eliminating resistance to rotation and moving to an extended sealing position only when the ball member has reached a closed position. The valves of this invention are thus easy to operate, have a long wear life, and eliminate heretofore encountered erosion and wear on seal members by fully encapsulating the seal member during all valve positions accommodating flow.

It is then an object of this invention to provide a rotary valve with a shiftable seal equipped poppet member that is encapsulated in the valve rotor until such time as it is projected into a valve port after the valve has reached its closed position and further rotation of the rotor is unnecessary.

Another object of this invention is to improve ball valves by incorporating an eccentric drive shaft and a poppet member driven thereby having a seat projected into sealed engagement with a valve port only after rotation of the ball member to its closed position has been accomplished.

A still further object of this invention is to provide a ball valve with an eccentric shifted poppet in the ball member for sealing the valve by projecting an encapsulated seal into tight sealed engagement with a valve port only after the rotor is moved to its closed position.

A still further object of this invention is to provide a ball valve with a slidable poppet in the ball member and an eccentric drive for the poppet member on the valve shaft which is effective to shift the poppet member for exposing a seal into sealed engagement with the inlet port of the valve.

Another object of this invention is to provide a ball type valve capable of metering, throttling and sealing bubble-tight even at very high pressures without damaging the seal and without incorporating a high torque resistance for operation of the valve.

Another and specific object of the invention is to provide a ball type valve with a poppet shiftable from a retracted position within the ball to an extended position into a flow port and providing a gradual buildup of seal pressure concurrent with the translation or shifting of the poppet into the flow port.

Other and further objects of this invention will be apparent to those skilled in this art from the following detailed description of the annexed sheets of drawings which, by way of a preferred example only, illustrate one embodiment of the invention.

On the drawings:

FIGURE 1 is a longitudinal cross sectional view of a ball valve according to this invention showing the valve in closed position.

FIGURE 2 is a top plan view partly in horizontal section, taken along the line II—II of FIG. 1.

FIGURE 3 is a longitudinal cross sectional view similar to FIG. 1 but showing the valve in opened position.

FIGURE 4 is a fragmentary longitudinal view of the valve shaft.

FIGURE 5 is a view of the valve shaft taken 90° from FIG. 4.

FIGURE 6 is a longitudinal view of the valve ball or rotor.

FIGURE 7 is a top plan view of the ball valve or rotor of FIG. 6.

FIGURE 8 is a view of the ball valve or rotor taken 90° from FIG. 6 along the line VIII—VIII of FIG. 6.

FIGURE 9 is a longitudinal view of the poppet member for the ball rotor.

FIGURE 10 is a fragmentary view similar to FIGS. 1 and 3 but showing the position of the rotor and poppet for fine metering through the valve.

As shown on the drawings:

In FIGS. 1 to 3 the reference numeral 10 designates generally a ball valve according to this invention. The valve 10 includes a housing 11 closed by a bonnet 12, a handle 13 above the bonnet 12 driving a shaft 14 projecting from the bonnet, a ball member or rotor 15 rotatably mounted in the housing 11 and a poppet 16 mounted in the rotor 15.

The housing or body 11 has a central open top cylindrical chamber 17 with a reduced diameter well 18 in the bottom thereof, an inlet port 19 in one side thereof and an outlet port 20 on the opposite side thereof. Both of the ports or passages 19 and 20 communicate with the central chamber 17 above the well 18 thereof.

The bonnet 12 has a head portion 21 overlying the body 11 and a reduced diameter neck portion 22 extended into the chamber 17 to a level in spaced relation above the level of the ports 19 and 20. Cap screws 23 extend through the head portion 21 and are threaded into the top of the body 11 to affix the bonnet 12 to the body. A resilient O-ring seal 24 backed by a nylon or Teflon washer 24a is seated in a groove 25 provided in the neck portion 22 of the bonnet for sealingly engaging the wall of the body chamber 17.

The neck 22 has a well 26 of the same diameter as the well 18 of the body and in aligned opposed relation thereto. Antifriction or sleeve bearings 27 and 28 are respectively mounted in the wells 18 and 26 to rotatably support the rotor 15 in the chamber 17. For this purpose the rotor has cylindrical collar end portions 29 and 30 received in the bearings.

As best shown in FIGS. 6 to 8 the rotor 15 has cylindrical passages 31 and 32 through the collars with the passage 32 having a reduced diameter eccentric passage 33 at the inner end thereof equipped with diametrically opposed notches 34. The passage 31 and the passage 32 through its reduced portion 33 are both connected to a transverse cylindrical bore 35 extending from one side of the rotor 15 to a reduced diameter port 36 at the opposite side. The port 36 is enlarged inwardly from the end thereof through a beveled section 37 to a larger cylindrical portion 38 which in turn is connected to the bore 35 by a beveled end wall 39.

As best shown in FIG. 8 the rotor 15 has a generally cylindrical body portion 40 between the cylindrical collar ends 29 and 30 and this body portion has an enlarged central area 40a of spherical (ball) shape providing top and bottom fragmental spherical seats 41 and 42 extending therearound from opposite sides of the mouth of the transverse bore or passageway 35. The intersection of the spherical central area 40a and the cylinder body 40 describes a circle in one plane as shown at 43.

The enlarged spherical portion 40a of the body 40 also has a transverse bore 45 therethrough normal to the bore 35 and intersecting the bore. The bore 45 extends straight through the body 40 at a constant diameter. The intersections of the spherical central area 40a and the cylindrical body also define circles in one plane as shown at 46 and 47 in FIG. 7.

A groove 48 is cut in the body 40 and extends around a portion of the periphery as shown in FIG. 2 to terminate at its ends in stops 49 for a purpose to be more fully hereinafter described.

The poppet 16 best shown in FIG. 9 is cylindrical as indicated at 50 and has a large transverse bore 51 extending therethrough together with a smaller intersecting transverse bore 52 at right angles to the bore 51. One end of the cylindrical poppet 16 has a reduced diameter nose 53 terminating at its forward free end in an outturned rim or head 54 and at its inboard end in a radial shoulder 55 which extends outwardly to an enlarged circular boss portion 56 that in turn extends to a tapered portion 57. The poppet 16 fits in the bore 35 of the rotor 15 with the tapered portion 57 mating with the tapered end 39 of the bore 35 and with the boss portion 56 mated with the reduced diameter bore 38. The nose 53 receives a compressible or flowable seal ring 58 therearound which, in its free state, has an external diameter flush with the boss 56 and larger than the rim 54. This seal ring 58 can be composed of any soft seat material preferably having a low coefficient of friction, some compressibility, some resiliency and flowability. The ring is completely encapsulated by the wall portion 38 of the rotor 15 until such time as it is extruded into the inlet port 19 as will be more full hereinafter described.

The shaft 14 as shown in FIGS. 4 and 5 has a cylindrical portion 60 extending to an eccentrically displaced cylindrical portion 61 with an enlarged central head 62 having a cylindrical transverse bore 63 therethrough. An end portion 64 concentric with the shaft portion 60 extends below the eccentric 61 and has a groove 65 therein. The upper end of the eccentric portion 61 has a hole 66 therethrough.

As shown in FIG. 1 the upper end of the shaft is tapered from the portion 60 at 67 and has a keyway 68 therein. The small end of the tapered portion is cylindrical and externally threaded at 69. The tapered portion receives the central boss 70 of the handle 13 and a nut 71 threaded on the portion 69 wedge locks the boss 70 to the tapered portion 67. The shaft portion 60 fits freely in a bore 72 of the bonnet head 21 and extends through the well 26 of the boss to receive a bearing race 73 therearound bottomed on the eccentric portion 61. A similar bearing race 73 surrounds the shaft portion 64 which portion extends into the sump 18a of the well 18 of the body. Plain or antifriction bearings 74 are interposed between the races 73 and the collars 29 and 30 of the rotor 16. Thus the shaft 14 is rotatably mounted in the rotor 15.

Seal grooves 75 are provided in the shaft portions 60 and 64 to receive O-ring resilient seals 76 backed by Teflon washers 77 for sealing the shaft in the bore 72 and in the sump 18a.

Plain or antifriction bearings 78 are also provided between the eccentric portion 61 and the poppet 16 on opposite sides of the head 62 and are bottomed on shoulders provided at the ends of the head. The bearings mount the poppet 16 on the shaft and are seated in the shaft bore 51 of the poppet on the eccentric 61 so that when the shaft is rotated relative to the poppet, the poppet will be subjected to the eccentric throw of the shaft portion 61 and will be forced to slide in the bore 35 of the rotor.

The hole 66 of the shaft receives a pair of detents 79 spread apart by a spring 80 to extend into the notches 34 of the rotor 15. When these detents are seated in the notches, the rotor 15 will move with the shaft 14 and will carry the poppet 16 therewith.

As illustrated in FIGS. 1 and 3 the bores 45 of the rotor 15, 52 of the poppet 16, and 63 of the shaft head 62 register with each other so that when the assembly is in the open position of FIG. 3 there is unrestricted flow communication between the inlet 19 and the outlet 20. However, when the assembly is rotated by the shaft 90° from the position of FIG. 3 to the position of FIG. 1 these communicated bores 45, 52 and 53 are at right angles to the inlet and outlet 19 and 20 and the valve is closed. It will, of course, be understood that the ball surfaces 41 and 42 of the rotor 15 have a close fit relation with the ball faces 81 and 82 in the chamber 17 of the body 11. Deformation of the surfaces 36, 37, 38 by pressure from the Teflon will close any clearance gap between 81 and 82. These surfaces will bow out like a diaphragm as Teflon pressure is built by the eccentric stroking.

As shown in FIG. 2 a stop pin 83 is mounted in a bore 84 of the housing registering with the groove 48 of the rotor. This pin 83 has an externally threaded head 85 threaded in the bore and a jam nut 86 on the head holds the pin at its adjusted position so that the end 87 thereof will ride in the groove 48 and will engage the end stops 49 at the ends of the groove. An O-ring seal 88 is provided around the stop pin to prevent leakage through the bore 84.

As shown in FIG. 1 the bonnet head 21 carries a stop pin 89 which projects thereabove to engage a set screw 90 projecting from the shaft 60. When the handle 13 is rotated to move the set screw 90 away from the pin 89, the stop pin 83 will ride in the groove 48 away from the one end stop 49 toward the other end stop 49 at the opposite end of the groove. This will permit the detents 79 to remain in the notches 34 and drive the rotor between opened and closed positions in the housing. However, when the rotation of the handle 13 is continued beyond the position where the stop pin 83 engages an end stop 49 the detents 79 will be unseated from the notches 34 because the further rotation of the rotor 15 will be arrested. Then the shaft will rotate inside of the rotor to shift the eccentric portion 61 thereof thereby sliding the poppet 16 in the bore 35 and ejecting the nose 53 into the inlet 19. The stops 49 at the ends of the groove 48 are so arranged that the stop will be engaged only when the nose is aligned with the inlet port. The eccentric throw of the shaft then forces the nose into the inlet port and causes the deformable seal ring 58 to flow into the port in tight engagement therewith.

As illustrated in FIGS. 1, 3 and 10 the various positions of the eccentric relative to the poppet 16 will bring about the full seal seat of the ring 58 in the inlet 19 or a partial seat to permit metering flow. In the open position illustrated in FIG. 3 the seal ring 58 is totally encapsulated between the nose 53 and the rotor bore 38 so as to be protected against erosion by the flowing fluid.

The arrangement is such that rotation of the handle 13 to move the set screw 90 away from the stop pin 89 through a 90° turn will move the valve from an open to a closed position whereupon further rotation in the same direction will bring the stop pin 83 against the stop 49 to arrest further rotation of the rotor 15 and cause the shaft to shift the poppet into its metering or sealing position in the inlet 19. Clearance in the rotor bore 35 readily accommodates the eccentric throw of the poppet in the rotor.

If desired the bore 45 in the rotor can have various configurations to negative dropping flow effects, etc. The bore 45 need not mate closely with the bore 52.

From the above descriptions it will therefore be understood that this invention provides a rotor or ball type valve with a poppet member that is eccentrically shifted in the rotor to effect sealing and metering without subjecting the rotor to high torsion friction or without exposing the seal to erosion by the fluid being handled through the valve.

I claim as my invention:

1. A ball valve which comprises a body having an open top central chamber with diametrically opposed side inlet and outlet ports, a bonnet secured to said body closing the open top of the chamber, a shaft rotatably supported in the bonnet and body extending through the chamber, a ball rotor rotatably mounted in said chamber and receiving the shaft therethrough, a poppet member extending transversely through said rotor and also receiving the shaft therethrough, said rotor, poppet and shaft having aligned passages selectively connecting the inlet and outlet ports of the body, said poppet having a nose portion adapted to selectively lie within the rotor and project through the rotor into the inlet port when said aligned passages are moved out of communication with the inlet and outlet ports, a deformable seal ring carried by and surrounding said nose and completely encapsulated within said rotor until the nose is projected into the inlet port for exposing the seal into sealed engagement with the port, drive means selectively connecting said shaft and rotor for co-rotation, stop means effective to disconnect the drive means when the aligned passages are out of communication with the inlet and outlet ports, and eccentric means on said shaft effective to shift the poppet member for projecting the nose into the inlet port when the stop means disconnects the shaft from the drive means.

2. A ball valve which comprises a body having an inlet, an outlet and a ball chamber therebetween, a ball member in the ball chamber having a passageway therethrough arranged to selectively connect the inlet and outlet, and a port circumferentially displaced from said passage adapted to be aligned with the inlet, a shaft rotatably mounted in said body, drive means selectively connecting the shaft and ball member to rotate the ball member for aligning the passageway with the inlet and outlet and for aligning the port with the inlet, a poppet member extending transversely through said ball member and also receiving the shaft therethrough, said poppet member having a nose adapted to selectively lie within the ball member and project through the port of the ball member into the inlet, and a deformable seal carried by and surrounding said nose positioned to be completely encapsulated by the ball member when the passageway of the ball member is positioned for accommodating flow between the inlet and outlet, and an eccentric surface on said shaft member effective to shift the poppet member for projecting the nose and seal through the port of the ball member into the inlet to seal the inlet in the closed position of the ball valve.

3. A ball valve which comprises housing means providing a ball chamber and inlet and outlet ports, a shaft member rotatably mounted in the housing means and extending across the chamber, a ball member in the chamber spaced from the chamber wall rotatably mounted in the housing receiving the shaft therethrough, a transversely shiftable poppet member in the ball member also receiving the shaft therethrough, said poppet member having a sealing nose portion, said ball member having a port completely encapsulating said sealing nose portion and receiving said nose portion out of contact with the walls of the ball chamber, drive means detachably connecting the shaft and rotor for co-rotation to move the rotor and poppet assembly between valve opening and valve closing positions, stop means effective to disconnect the drive means between the shaft and rotor when the nose of the poppet is aligned with the inlet of the housing, and eccentric means on said shaft effective to shift the poppet means to project the nose into the inlet in sealed engagement therewith for tightly sealing the valve.

4. A ball type flow control valve including a housing, a ball member rotatably mounted in the housing for opening and closing the valve and a drive shaft rotatably mounted in the housing and in the ball member for moving the ball member between valve opening and valve closing positions, the improvement of a poppet member transversely shiftable in the ball member having a sealing nose adapted to be projected from a retracted position within the ball member completely encapsulated by the ball member into sealed engagement with a port of the valve housing, and eccentric means on said shaft for shifting said poppet member to selectively project and retract the nose from sealed engagement with a valve port into completely confined relation within the ball member.

5. In a rotary flow control valve including a housing with a rotor mounted therein for opening and closing the valve, the improvement of a transversely shiftable poppet in the rotor having a nose for sealing the port of a valve, a deformable seal around said nose confined within the rotor during all open positions of the valve and projected from the rotor into sealed engagement with a valve port in the closed position of the valve, and drive means for shifting the poppet relative to the rotor to project and retract the nose of the poppet.

6. A ball type valve which comprises a housing having a valve operating chamber with inlet and outlet ports, a rotor rotatably mounted in said chamber for placing said ports into and out of communication, a poppet member slidably mounted in said rotor having a sealing nose portion adapted to be confined and completely encapsulated within the rotor out of contact with the housing and projected from the rotor into a port, a shaft rotatably mounted in the housing extended through the rotor and poppet member, said rotor, poppet member and shaft having registered passages therethrough for connecting the port when the assembly is rotated to the open position of the valve, eccentric means on said shaft for shifting the poppet member in the rotor to move the nose into and out of sealed engagement with a port, spring pressed detent means on said shaft, notches in said rotor receiving said detent means for drivingly connecting the rotor and shaft, stop means on said rotor limiting rotation thereof and effective to disconnect the spring pressed detents when the poppet nose is aligned with a port whereupon continued rotation of the shaft will shift the poppet in the rotor to actuate the seating and unseating of the nose member in a port.

7. In a flow control valve of the type having a rotor for opening and closing the valve ports, the improvement of a poppet member slidably mounted in the rotor having a port sealing nose adapted to be projected from the rotor, and deformable seal means on the nose encapsulated by the rotor in all open positions of the valve and sealingly engaging the valve port in the closed position of the valve.

References Cited
UNITED STATES PATENTS

| | | | |
|---|---|---|---|
| 1,671,521 | 5/1928 | Fisher | 64—29 |
| 1,927,855 | 9/1933 | Swanson | 251—163 |
| 2,988,109 | 5/1961 | Komrosky | 137—630.15 |

FOREIGN PATENTS

| | | |
|---|---|---|
| 26,205 | 2/1908 | Norway. |

WILLIAM F. O'DEA, *Primary Examiner.*

HOWARD M. COHN, *Assistant Examiner.*

U.S. Cl. X.R.

251—163, 297; 137—614.11